W. GOODWIN.
APPARATUS FOR TRANSHIPPING GRAIN.
No. 175,073. Patented March 21, 1876.
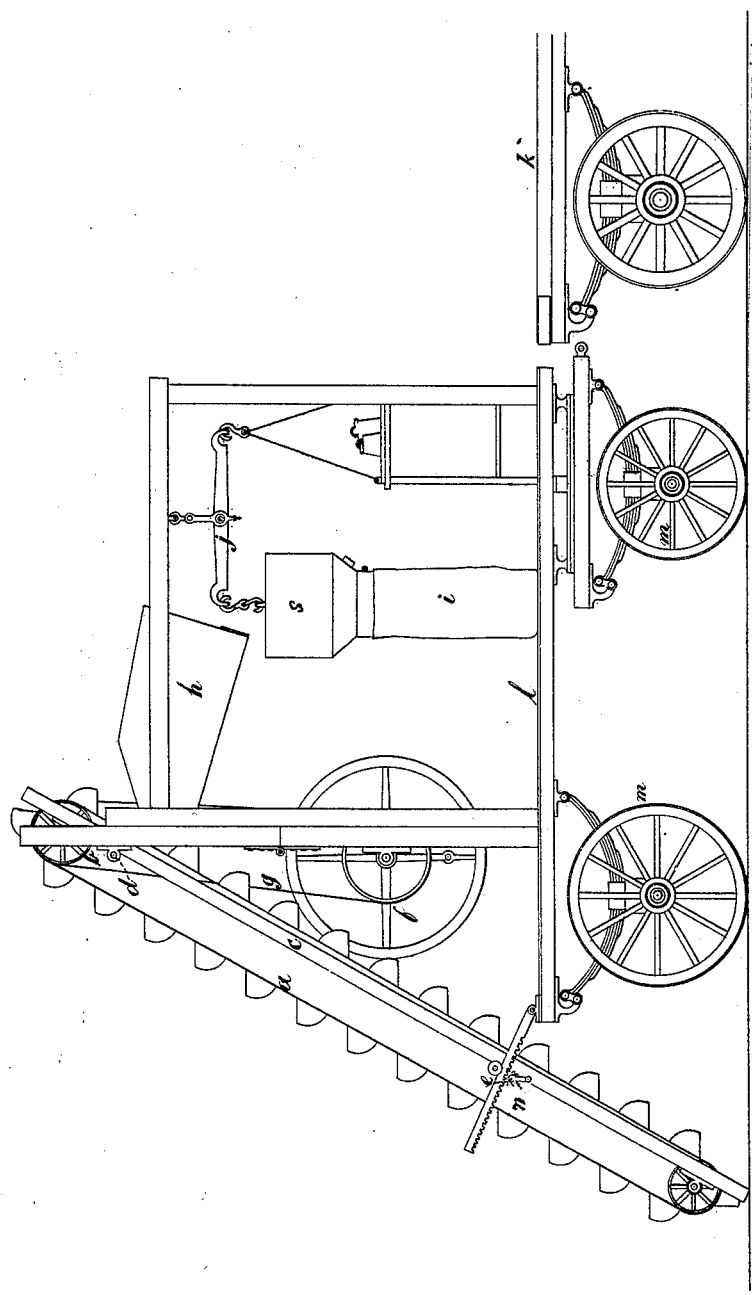
Witnesses
James Johnson.
John Sing
Inventor
William Goodwin

UNITED STATES PATENT OFFICE.

WILLIAM GOODWIN, OF LIVERPOOL, ENGLAND.

IMPROVEMENT IN APPARATUS FOR TRANSSHIPPING GRAIN.

Specification forming part of Letters Patent No. 175,073, dated March 21, 1876; application filed November 29, 1875.

*To all whom it may concern:*

Be it known that I, WILLIAM GOODWIN, of Liverpool, in the county of Lancaster, England, have invented Improvements in Apparatus or Appliances for Facilitating the Transfer of Grain and bulk substances, of which the following is a specification:

The object of the said invention is to facilitate the conveyance of grain or other bulk cargo or substance from ship, quay, or other place to a warehouse or store-room when sacks or other containers and carts or vehicles are employed.

For the above purpose I employ a portable apparatus, in combination with an endless bucket or similar elevator. The elevator, preferably operated by hand, raises the grain, salt, or the like from the quay or other place, and delivers it into a hopper at or near the top of the portable apparatus.

The portable apparatus consists, mainly, of a platform on wheels and a hopper placed over the platform. The floor of the platform is placed at the height of the level of the floor of the carrying lorrie or vehicle, or it is adjustable to any required height. The sacks or other containers, when placed on the said platform, are filled from the hopper above mentioned, through a chute. The endless band is preferably attached to the platform, but may, if desired, be carried by separate frame-work. The hopper may be fitted with a vibrating screen. Also, I combine the hopper with the elevator, the two portions being each portable, and, when required for use, bring them close together, so that the grain or substance in bulk shall deliver onto or over the platform. An automatic steelyard or other weighing apparatus or machine is used in combination with the apparatus, constructed as hereinbefore described.

The elevation on the accompanying sheet of drawings is illustrative of my invention.

$a$ is the elevator, consisting of an endless band and buckets, carried by the pulleys $b$, attached to the stretcher $c$. The said stretcher $c$ works on the pivots $d$, and is adjusted by the rack $e$ and pinion $n$. $f$ is a crank-wheel, operated by hand, giving motion to the band $a$ through the strap $g$ and pulley $b$. The grain raised by the motion of the band $a$ is deposited in the hopper $h$, whence it falls, after weighing, into the sack $i$, attached to the hopper or bucket $s$ on the scale-beam $j$. The said sacks, when filled, are removed to the wagon or vehicle $k$. The carrying-platform $l$ is supported on wheels $m$, and is of suitable height for the above purposes, or it may be adjustable as to height.

Instead of filling into sacks, the grain may be run direct from the hopper into a cart or other container constructed for carrying grain in bulk.

Having now particularly described and ascertained the nature of my said invention, I would have it understood that I do not claim elevating grain and bulk substances by means of an endless band; nor do I claim the weighing apparatus; but What I do claim is—

1. The hopper or bucket $s$, attached to one end of a scale-beam, and adapted to holding a bag for simultaneously weighing and sacking grain, in combination with an elevator and hopper, substantially as set forth.

2. The combination of adjustable elevator $a$, hopper $h$, bucket $s$, bag $i$, and counterweighted scale-beam, all mounted on a movable truck, substantially as set forth.

WILLIAM GOODWIN.

Witnesses:
JAMES JOHNSON,
JOHN LING.